US012691926B2

(12) United States Patent
Zhang

(10) Patent No.: US 12,691,926 B2
(45) Date of Patent: Jul. 28, 2026

(54) ROTATION ANGLE LIMITING MECHANISM AND VEHICLE STEERING SYSTEM AND VEHICLE HAVING SAME

(71) Applicant: BYD COMPANY LIMITED, Shenzhen (CN)

(72) Inventor: Peng Zhang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 509 days.

(21) Appl. No.: 18/210,786

(22) Filed: Jun. 16, 2023

(65) Prior Publication Data

US 2023/0339532 A1 Oct. 26, 2023

Related U.S. Application Data

(63) Continuation of application No. PCT/CN2021/142668, filed on Dec. 29, 2021.

(30) Foreign Application Priority Data

Dec. 30, 2020 (CN) .......................... 202011627883.0

(51) Int. Cl.
*B62D 1/20* (2006.01)
*B62D 1/16* (2006.01)
*B62D 5/00* (2006.01)

(52) U.S. Cl.
CPC ................. *B62D 1/20* (2013.01); *B62D 1/16* (2013.01); *B62D 5/001* (2013.01); *B60Y 2400/83* (2013.01); *B60Y 2410/102* (2013.01)

(58) Field of Classification Search
CPC . B62D 1/20; B62D 5/001; B62D 1/16; B60Y 2400/83; B60Y 2410/102; G05G 5/04; Y10T 74/2063
See application file for complete search history.

(56) References Cited

U.S. PATENT DOCUMENTS 2,746,573 A * 5/1956 Hastings ................... G05G 5/04
192/139
2,883,634 A * 4/1959 Origoni ................... H01F 38/18
336/120

(Continued)

FOREIGN PATENT DOCUMENTS

CN 102548829 U 7/2012
CN 204432743 U 7/2015

(Continued)

OTHER PUBLICATIONS

International Search Report and Written Opinion for Application No. PCT/CN2021/142668, mailed on Mar. 24, 2022, 9 pages.

(Continued)

*Primary Examiner* — Timothy Wilhelm
(74) *Attorney, Agent, or Firm* — Sheppard Mullin Richter & Hampton LLP

(57) ABSTRACT

A rotation angle limiting mechanism includes: a turntable, wherein at least one fitting structure is disposed on the turntable; and a moving member, wherein a first limiting structure and a second limiting structure are disposed on the moving member; the turntable rotates and drives the moving member to move so that the fitting structure abuts against one of the first limiting structure or the second limiting structure; the turntable is at a first extreme position when the fitting structure abuts against the first limiting structure; and the turntable is at a second extreme position when the fitting structure abuts against the second limiting structure.

18 Claims, 7 Drawing Sheets

(56) References Cited

U.S. PATENT DOCUMENTS

| | | | | |
|---|---|---|---|---|
| 2,903,893 | A * | 9/1959 | Scott | G05G 5/04 74/10.2 |
| 2,991,662 | A * | 7/1961 | Werner | G05G 5/04 475/158 |
| 3,147,629 | A * | 9/1964 | Michalec | G05G 5/04 192/139 |
| 3,272,031 | A * | 9/1966 | Beck | H01H 19/03 74/10.2 |
| 3,353,416 | A * | 11/1967 | Flint | H03J 5/02 74/89.45 |
| 3,762,523 | A * | 10/1973 | Thorsby | G05G 5/04 192/139 |
| 3,948,119 | A * | 4/1976 | Schlapp | G05G 5/04 192/139 |
| 4,466,658 | A * | 8/1984 | Furst | B60J 7/057 296/222 |
| 4,651,580 | A * | 3/1987 | Deane | H02K 7/06 475/299 |
| 4,702,123 | A * | 10/1987 | Hirao | F16F 9/462 192/142 R |
| 5,050,443 | A * | 9/1991 | Stocker | B62D 5/005 267/156 |
| 6,688,645 | B2 * | 2/2004 | Andonian | B62D 5/001 180/6.26 |
| 7,213,341 | B2 * | 5/2007 | Staudt | B62D 15/0215 324/207.25 |
| 7,676,891 | B2 * | 3/2010 | Lacroix | G05G 25/02 16/DIG. 30 |
| 10,209,733 | B2 * | 2/2019 | Zhao | G05G 5/04 |
| 10,216,214 | B2 * | 2/2019 | Park | G05G 5/04 |
| 11,014,594 | B2 * | 5/2021 | Forte | B62D 1/166 |
| 11,027,770 | B2 * | 6/2021 | Cimatti | B62D 5/001 |
| 11,485,403 | B2 * | 11/2022 | Walentowski | B62D 1/16 |
| 11,644,066 | B2 * | 5/2023 | Capela | F16C 29/04 464/162 |
| 11,801,886 | B2 * | 10/2023 | Büker | B62D 5/001 |
| 11,820,421 | B2 * | 11/2023 | Lee | B62D 1/16 |
| 11,840,289 | B2 * | 12/2023 | Heo | B62D 1/16 |
| 11,945,518 | B2 * | 4/2024 | Fujita | B62D 5/001 |
| 12,045,079 | B1 * | 7/2024 | Wu | G05G 5/04 |
| 12,168,482 | B2 * | 12/2024 | Galehr | B62D 5/001 |
| 12,233,961 | B2 * | 2/2025 | Reiter | B62D 1/16 |
| 12,252,186 | B2 * | 3/2025 | Lee | B62D 5/001 |
| 2002/0124680 | A1 * | 9/2002 | Sjodin | G05G 5/04 74/526 |
| 2003/0141134 | A1 | 7/2003 | Sherwin | |
| 2003/0184072 | A1 | 10/2003 | Andonian et al. | |
| 2005/0127901 | A1 * | 6/2005 | Johnson | G01D 5/147 324/207.2 |
| 2005/0155809 | A1 | 7/2005 | Krzesicki et al. | |
| 2005/0274565 | A1 | 12/2005 | Greenwell et al. | |
| 2009/0188728 | A1 | 7/2009 | Osborne | |
| 2017/0369091 | A1 * | 12/2017 | Nash | B62D 1/185 |
| 2018/0186400 | A1 | 7/2018 | Hsu et al. | |
| 2020/0086908 | A1 * | 3/2020 | Forte | B62D 5/001 |
| 2020/0130725 | A1 * | 4/2020 | Ishimura | B62D 5/001 |
| 2023/0322298 | A1 * | 10/2023 | Zhang | B62D 15/029 180/402 |

FOREIGN PATENT DOCUMENTS

| | | | |
|---|---|---|---|
| CN | 207747931 U | 8/2018 | |
| CN | 109229199 A | 1/2019 | |
| CN | 110696912 A | 1/2020 | |
| CN | 110949501 A | 4/2020 | |
| CN | 111006886 A | 4/2020 | |
| CN | 210427027 U | 4/2020 | |
| CN | 111219419 A | 6/2020 | |
| CN | 210971246 U | 7/2020 | |
| CN | 111559420 A | 8/2020 | |
| CN | 211336154 U | 8/2020 | |
| CN | 211336155 U | 8/2020 | |
| CN | 211336156 U | 8/2020 | |
| CN | 211494208 U | 9/2020 | |
| CN | 211869497 U | 11/2020 | |
| CN | 211869498 U | 11/2020 | |
| CN | 214112672 U | 9/2021 | |
| DE | 102018217506 A1 * | 4/2020 | B62D 5/001 |
| DE | 102019202294 A1 | 8/2020 | |
| IN | 110949500 A | 4/2020 | |
| JP | 2000-198453 A | 7/2000 | |
| JP | 2001-191937 A | 7/2001 | |
| JP | 2003048550 A | 2/2003 | |
| JP | 2004-210200 A | 7/2004 | |
| JP | 2006062527 A | 3/2006 | |
| JP | 2006-193083 A | 7/2006 | |
| JP | 2013-177045 A | 9/2013 | |
| JP | 2017-007402 A | 1/2017 | |
| JP | 2018-155301 A | 10/2018 | |
| JP | 2020-069844 A | 5/2020 | |
| JP | 2020-193658 A | 12/2020 | |
| KR | 20100099498 A | 9/2010 | |
| KR | 10-1491304 B1 | 2/2015 | |
| WO | 2020/031294 A1 | 2/2020 | |

OTHER PUBLICATIONS

Examination Report No. 1 dated Jun. 29, 2024, issued in Australian Patent Application No. 2021411028 (4 pages).

Examination Report No. 2 dated May 20, 2025, issued in Australian Patent Application No. 2021411028 (4 pages).

Extended European Search Report dated Apr. 18, 2024, issued in European Patent Application No. 21914536.4 (9 pages).

Notice of Reasons for Refusal dated Jun. 11, 2024, issued in Japanese Patent Application No. 2023-539304 with English machine translation (10 pages).

Request for the Submission of an Opinion dated Jul. 21, 2025, issued in Korean Patent Application No. 10-2023-7018919 with English machine translation (11 pages).

First Office Action and Search Report dated Dec. 7, 2022, issued in Chinese Patent Application No. 202011627883.0, with English machine translation (13 pages).

* cited by examiner

200

200

C-C

D

ROTATION ANGLE LIMITING MECHANISM AND VEHICLE STEERING SYSTEM AND VEHICLE HAVING SAME

CROSS-REFERENCE TO RELATED APPLICATIONS

This application is a Continuation Application of International Patent Application No. PCT/CN2021/142668, filed on Dec. 29, 2021, which is based on and claims priority to and benefits of Chinese Patent Application No. 202011627883.0, filed on Dec. 30, 2020. The entire content of all of the above-referenced applications is incorporated herein by reference.

FIELD

The present disclosure relates to the technical field of rotation angle limitation, and more particularly, to a rotation angle limiting mechanism and a vehicle steering system and a vehicle having same.

BACKGROUND

In the related art, a traditional mechanical connection between a steering wheel and a wheel hub is canceled in a steering-by-wire system, and signals are transmitted through a data bus and feedback commands are acquired from a steering control system. However, since a steering gear cannot provide mechanical limitation to a steering shaft in the steering-by-wire system, the steering shaft needs to be provided with a rotation angle limiting mechanism to avoid damages to components such as a clock spring and an angle sensor caused by the arbitrary rotation of the steering wheel.

SUMMARY

The present disclosure resolves one of technical problems in the related art.

A first aspect of the present disclosure provides a rotation angle limiting mechanism, which can achieve angle limitation of a steering wheel, thereby avoiding damages to components such as a clock spring and an angle sensor caused by the arbitrary rotation of the steering wheel.

A second aspect of the present disclosure provides a vehicle steering system having the above rotation angle limiting mechanism.

A third aspect of the present disclosure provides a vehicle having the above vehicle steering system.

The rotation angle limiting mechanism in the present disclosure includes: a turntable, where at least one fitting structure is disposed on the turntable; and a moving member, where a first limiting structure and a second limiting structure are disposed on the moving member. The turntable rotates and drives the moving member to move so that the fitting structure abuts against one of the first limiting structure or the second limiting structure. The turntable is at a first extreme position when the fitting structure abuts against the first limiting structure. The turntable is at a second extreme position when the fitting structure abuts against the second limiting structure.

According to the rotation angle limiting mechanism in embodiments of the present disclosure, the turntable and the moving member are disposed, the at least one fitting structure is disposed on the turntable, the first limiting structure and the second limiting structure are disposed on the moving member, the turntable rotates and drives the moving member to move so that the fitting structure abuts against one of the first limiting structure or the second limiting structure. Further rotation of the turntable can be effectively limited when the fitting structure abuts against the first limiting structure or the second limiting structure, thereby achieving the effective limitation. When the rotation angle limiting mechanism is applied to a vehicle steering system in which a steering shaft is separated from a steering gear, such as a steering-by-wire system, the rotation angle limitation of a steering wheel can be realized, thereby avoiding damages to components such as a clock spring and an angle sensor caused by the arbitrary rotation of the steering wheel. The rotation angle limiting mechanism has a high reliability.

According to some embodiments of the present disclosure, the first limiting structure and the second limiting structure are disposed on an outer circumferential surface of the moving member.

According to some embodiments of the present disclosure, the first limiting structure and the second limiting structure are disposed spaced apart from each other along a circumferential direction of the moving member.

According to some embodiments of the present disclosure, each of the first limiting structure and the second limiting structure includes a protruding portion.

According to some embodiments of the present disclosure, the moving member includes a moving body and a mounting portion disposed on a side surface of the moving body facing the turntable. A cross-sectional area of the mounting portion is less than a cross-sectional area of the moving body.

Two protruding portions are disposed on an outer circumferential surface of the mounting portion. The two protruding portions are spaced apart from each other along a circumferential direction of the mounting portion.

According to some embodiments of the present disclosure, a groove is formed on the moving member. The first limiting structure and the second limiting structure are disposed in the groove.

According to some embodiments of the present disclosure, each of the first limiting structure and the second limiting structure includes a limiting protrusion.

According to some embodiments of the present disclosure, the first limiting structure is disposed on the outer circumferential surface of the moving member. A groove is formed on the moving member. The second limiting structure includes a limiting protrusion disposed in the groove.

According to some embodiments of the present disclosure, the moving member includes an opening extending radially through the moving member. The fitting structure rotates from an outer periphery of the moving member to the groove through the opening when the turntable rotates from the first extreme position to the second extreme position.

The fitting structure rotates from the groove to the outer periphery of the moving member through the opening when the turntable rotates from the second extreme position to the first extreme position.

According to some embodiments of the present disclosure, at least two pairs of limiting structure are disposed on the moving member, and each of the at least two pairs of limiting structure includes the first limiting structure and the second limiting structure. A first pair of the at least two pairs of limiting structure is disposed on an outer circumferential surface of the moving member. A second pair of the at least two pairs of limiting structure is disposed on a side wall of the groove.

According to some embodiments of the present disclosure, the fitting structure includes at least one limiting bump disposed on the turntable.

According to some embodiments of the present disclosure, the at least one limiting bump includes a first limiting bump and a second limiting bump disposed on the turntable.

The first limiting bump is disposed adjacent to a center of the turntable, and the second limiting bump is disposed away from the center of the turntable with respect to the first limiting bump.

According to some embodiments of the present disclosure, the fitting structure is disposed on a surface of the turntable facing the moving member.

According to some embodiments of the present disclosure, a spiral groove is disposed on the turntable. A guide shaft is disposed on the moving member. The guide shaft movably fits in the spiral groove. The turntable drives the moving member to move through the guide shaft.

According to some embodiments of the present disclosure, a rotation angle of the spiral groove in the circumferential direction of the turntable is α. α satisfies: 720°≤α≤1440°.

According to some embodiments of the present disclosure, the rotation angle limiting mechanism further includes a fixed member. A fitting groove is formed on the fixed member. The moving member movably fits in the fitting groove. The moving member moves in the fitting groove when the turntable rotates.

According to some embodiments of the present disclosure, a maximum torque borne by the rotation angle limiting mechanism is M. M satisfies: M≥50 N·m.

A vehicle steering system in an embodiment of a second aspect of the present disclosure includes: a steering shaft and a rotation angle limiting mechanism. The rotation angle limiting mechanism is the rotation angle limiting mechanism according to the embodiment of the first aspect of the present disclosure. The turntable of the rotation angle limiting mechanism is fixed to the steering shaft.

A vehicle in an embodiment of a third aspect of the present disclosure includes the vehicle steering system in the embodiment of the second aspect of the present disclosure.

Additional aspects and advantages of the present disclosure are provided in the following description, some of which will become apparent from the following description or may be learned from practices of the present disclosure.

BRIEF DESCRIPTION OF THE DRAWINGS

The above and/or additional aspects and advantages of the present disclosure will become apparent and comprehensible from the description of the embodiments provided with reference to the following drawings.

4

Figure 7:
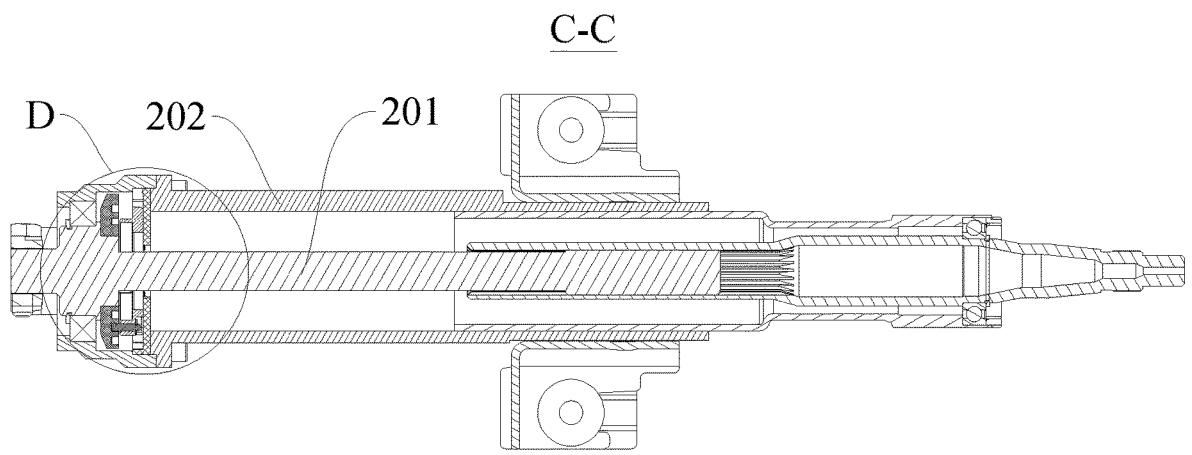
FIG. 7 is a cross-sectional view along a line C-C in FIG. 6.
Figure 8:
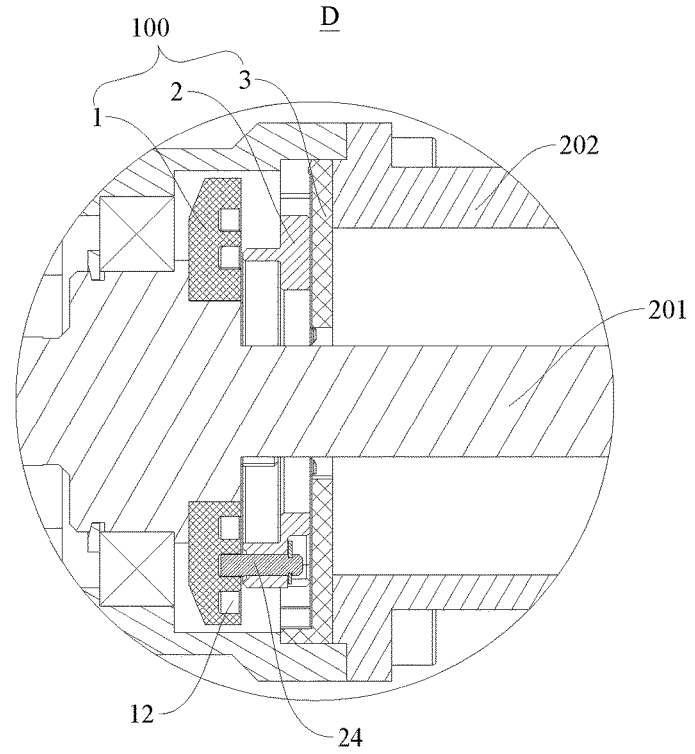

FIG. 8 is an enlarged view of a part D circled in FIG. 7.

Figure 9:
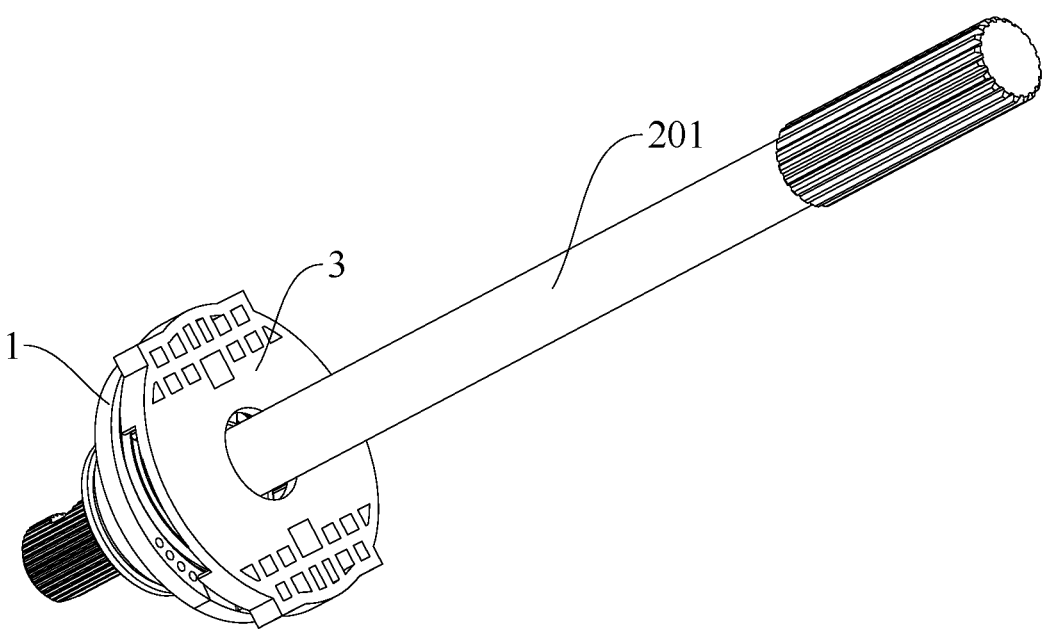

FIG. 9 is an assembly diagram of a turntable, a steering shaft, a fixed member, and a moving member of the vehicle steering system according to an embodiment of the present disclosure.

Figure 10:
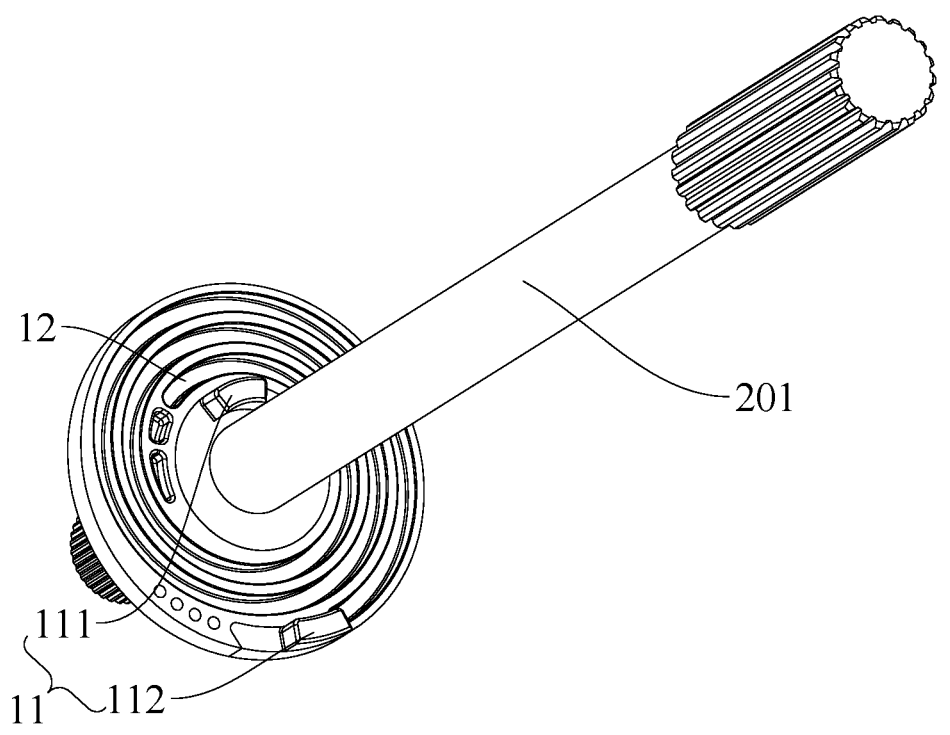

FIG. 10 is a schematic connection diagram of the turntable and the steering shaft according to an embodiment of the present disclosure.

Figure 11:
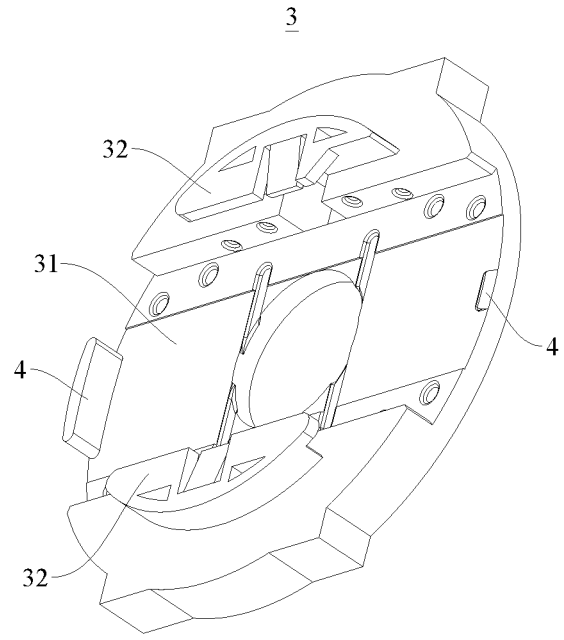

FIG. 11 is a perspective view of a fixed member according to an embodiment of the present disclosure.

Figure 12:
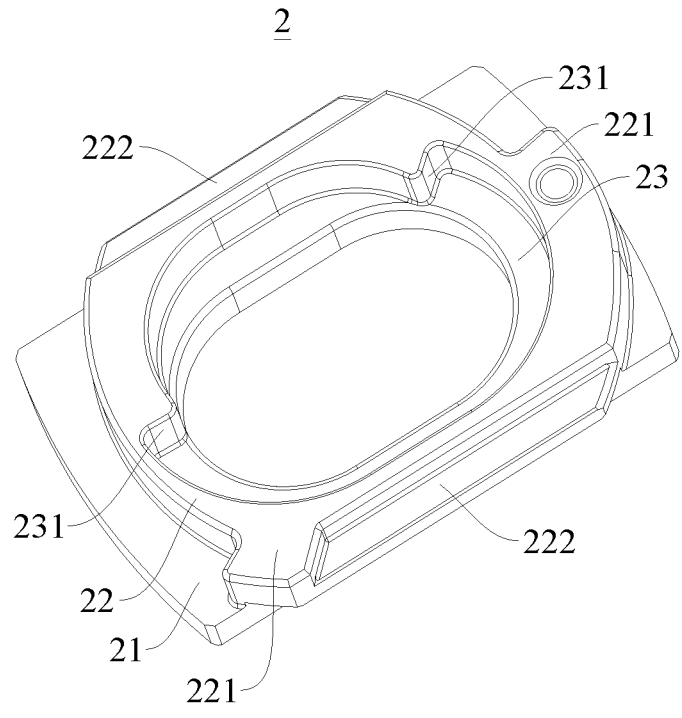

FIG. 12 is a perspective view of the moving member according to an embodiment of the present disclosure.

Figure 13:
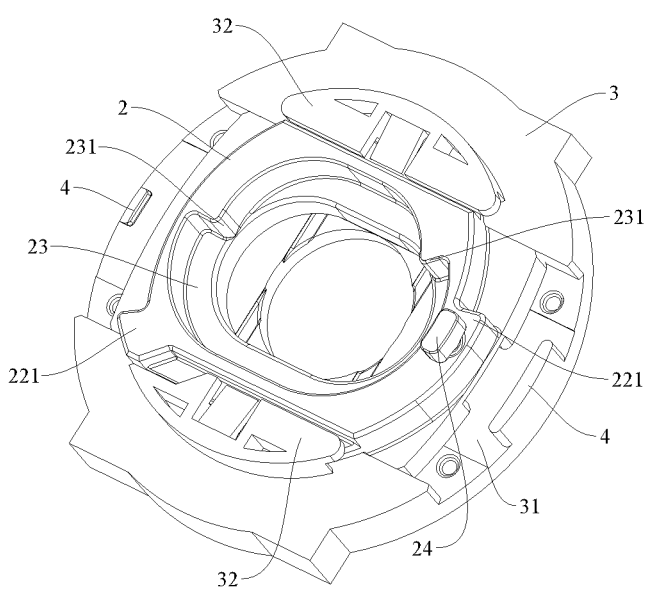

FIG. 13 is an assembly diagram of the moving member and the fixed member according to an embodiment of the present disclosure.

Figure 14:
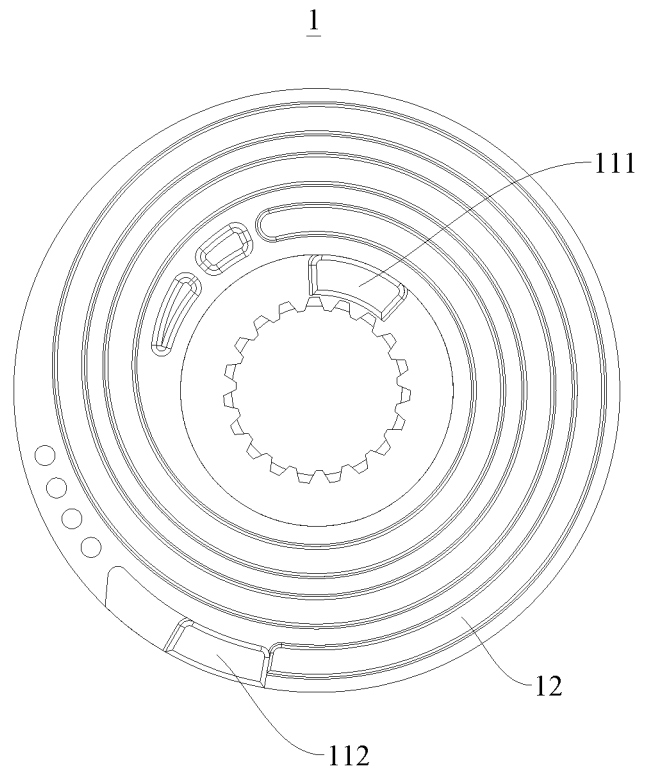

FIG. 14 is a structural diagram of the turntable according to an embodiment of the present disclosure.

REFERENCE NUMERALS

100: Rotation angle limiting mechanism;
1: Turntable; 11: Fitting structure; 111: First limiting bump;
112: Second limiting bump; 12: Spiral groove;
2: Moving member; 21: Moving body; 22: Mounting portion;
221: Protruding portion; 222: Moving portion;
23: Groove; 231: Limiting protrusion; 24: Guide shaft;
3: Fixed member; 31: Fitting groove; 32: Fitting portion;
4: Boss;
200: Vehicle steering system; 201: Steering shaft; and
202: Housing.

DETAILED DESCRIPTION

Embodiments of the present disclosure are described in detail below, and embodiments are shown in the drawings, where the same or similar elements or the elements having the same or similar functions are represented by the same or similar reference numerals throughout the description. The embodiments described below with reference to the drawings are used for explaining the present disclosure, and do not limit the present disclosure.

A rotation angle limiting mechanism 100 in the embodiments of the present disclosure is described below with reference to FIG. 1 to FIG. 14. The rotation angle limiting mechanism 100 is applicable to a vehicle steering system 200. In the following description of the present disclosure, the rotation angle limiting mechanism 100 is applied to the vehicle steering system 200 as an example. Certainly, a person skilled in the art may understand that the rotation angle limiting mechanism 100 may also be applied to other types of systems.

As shown in FIG. 4, FIG. 5, FIG. 7, and FIG. 8, the rotation angle limiting mechanism 100 in the embodiments of the present disclosure includes a turntable 1 and a moving member 2.

In an embodiment, at least one fitting structure 11 is arranged/disposed on the turntable 1, and a first limiting structure and a second limiting structure are arranged/disposed on the moving member 2. The turntable 1 rotates and drives the moving member 2 to move so that the fitting structure 11 abuts against one of the first limiting structure or the second limiting structure. The turntable 1 is at a first extreme position when the fitting structure 11 abuts against the first limiting structure, and the turntable 1 is at a second extreme position when the fitting structure 11 abuts against the second limiting structure.

For example, when the rotation angle limiting mechanism 100 is applied to the vehicle steering system 200, such as a steering-by-wire system, the turntable 1 may be fixed to a steering shaft 201. When a driver controls a steering wheel of a vehicle to drive the steering shaft 201 to rotate in a first rotation direction, such as a clockwise direction, the turntable 1 may rotate with the steering shaft 201 in the first rotation direction and drive the moving member 2 to move. When the fitting structure 11 abuts against the first limiting structure, the turntable 1 rotates to the first extreme position. In this case, the turntable 1 cannot further rotate in the first rotation direction, but can rotate in a second rotation direction opposite to the first rotation direction, such as a counterclockwise direction, so that angle limitation of the steering shaft 201 in the first rotation direction can be achieved. When a driver controls a steering wheel of a vehicle to drive the steering shaft 201 to rotate in the second rotation direction, such as a counterclockwise direction, the turntable 1 may rotate with the steering shaft 201 in the second rotation direction and drive the moving member 2 to move. When the fitting structure 11 abuts against the second limiting structure, the turntable 1 rotates to the second extreme position. In this case, the turntable 1 cannot further rotate in the second rotation direction, but can rotate in the first rotation direction, so that angle limitation of the steering shaft 201 in the second rotation direction can be achieved.

Since the fitting structure 11 can abut against the first limiting structure when the turntable 1 is at the first extreme position or abut against the second limiting structure when the turntable 1 is at the second extreme position, further rotation of the turntable 1 can be limited, thereby achieving the rotation angle limitation of the turntable 1. In addition, the rotation angle limiting mechanism 100 has a simple structure and a high reliability. Moreover, in this way, the rotation angle limiting mechanism 100 may be applied to the vehicle steering system 200 in which the steering shaft 201 is separated from a steering gear, such as a steering-by-wire system, so that the damage to components such as a clock spring and an angle sensor caused by the arbitrary rotation of the steering wheel can be avoided. In addition, by configuring the above moving member 2, the fitting structure 11 can abut against the corresponding first limiting structure or second limiting mechanism when the turntable 1 is at the first extreme position or second extreme position. When the turntable is at other positions, the fitting structure 11 may be staggered from the first limiting structure and the second limiting structure, thereby achieving the large angle limitation by the rotation angle limiting mechanism 100 and satisfying a steering requirement of a vehicle.

According to the rotation angle limiting mechanism 100 in embodiments of the present disclosure, the turntable 1 and the moving member 2 are configured, the at least one fitting structure 11 is arranged/disposed on the turntable 1, the first limiting structure and the second limiting structure are arranged/disposed on the moving member 2, the turntable 1 rotates and drives the moving member 2 to move so that the fitting structure 11 abuts against one of the first limiting structure or the second limiting structure. Further rotation of the turntable 1 can be effectively led when the fitting structure 11 abuts against the first limiting structure or the second limiting structure, thereby achieving the effective limitation. When the rotation angle limiting mechanism 100 is applied to the vehicle steering system 200 in which the steering shaft 201 is separated from the steering gear, such as a steering-by-wire system, the rotation angle limitation of a steering wheel can be realized, thereby avoiding the damage to components such as a clock spring and an angle sensor caused by the arbitrary rotation of the steering wheel. The rotation angle limiting mechanism has a high reliability.

According to some embodiments of the present disclosure, with reference to FIG. 10, FIG. 12, and FIG. 14, the first limiting structure and the second limiting structure may be arranged/disposed on an outer circumferential surface of the moving member 2. In this way, the first limiting structure and the second limiting structure effectively stop and limit the fitting structure 11. Moreover, since a space on the outer circumferential surface of the moving member 2 is large, the first limiting structure and the second limiting structure can be conveniently formed thereon.

According to some embodiments of the present disclosure, the first limiting structure and the second limiting structure are spaced apart from each other along a circumferential direction of the moving member 2. For example, in the examples of FIG. 10, FIG. 12, and FIG. 14, the moving member 2 includes a moving body 21 and a mounting portion 22. The mounting portion 22 is arranged/disposed on a side surface of the moving body 21 facing the turntable 1. A cross-sectional area of the mounting portion 22 may be less than a cross-sectional area of the moving body 21. Two protruding portions 221 are arranged/disposed on an outer circumferential surface of the mounting portion 22. The two protruding portions 221 are spaced apart from each other in a circumferential direction of the mounting portion 22. The two protruding portions 221 are respectively the first limiting structure and the second limiting structure. At least a part of a side surface of each protruding portion 221 away from the turntable 1 is connected with the moving body 21, thereby improving the structural strength of the first limiting structure and the second limiting structure. Therefore, by configuring the first limiting structure and the second limiting structure apart from each other, forces of the first limiting structure and the second limiting structure on the moving member 2 may be dispersed, so that the force on the moving member 2 is more uniform, thereby realizing the more stable movement of the moving member 2.

Certainly, the present disclosure is not limited to thereto. According to some other embodiments of the present disclosure, with reference to FIG. 10, FIG. 12, and FIG. 14, a groove 23 is formed on the moving member 2. The first limiting structure and the second limiting structure may be limiting protrusions 231 disposed on the groove 23. In the examples of FIG. 12, the first limiting structure and the second limiting structure on the groove 23 may be spaced apart from each other in the circumferential direction of the moving member 2. In this way, the above first limiting structure and second limiting structure can effectively stop and limit the fitting structure 11, thereby preventing further rotation of the turntable 1 when the turntable 1 rotates to the first extreme position and the second extreme position. Moreover, the first limiting structure and the second limiting structure configured in such a way can reduce a space occupied in a transverse direction of the moving member 2, thereby achieving a more compact structure of the entire rotation angle limiting mechanism 100. In addition, by configuring the groove 23, a weight of the entire moving member 2 can be reduced, thereby helping the turntable 1 drive the moving member 2 to move. Therefore, the smoothness of the movement of the turntable 1 and the moving member 2 can be effectively improved, and the costs can be reduced.

According to some embodiments of the present disclosure, referring to FIG. 12, at least two pairs of first limiting structures and second limiting structures are configured. One first limiting structure and one second limiting structure form a pair. One pair is arranged/disposed on the outer circumferential surface of the moving member 2. The other pair is arranged/disposed on a side wall of the groove 23. By configuring at least two pairs of first limiting structures and second limiting structures, a limiting failure caused by the damage of one of the first limiting structures or the second limiting structures can be avoided. When the rotation angle limiting mechanism 100 is applied to the vehicle steering system 200 such as a steering-by-wire system, the limiting reliability of the vehicle steering system 200 can be further ensured, thereby further avoiding damage to components such as a clock spring and an angle sensor caused by the arbitrary rotation of the steering wheel. In this way, a service life of the vehicle steering system 200 can be effectively increased, and the driving safety is further ensured.

According to some \ embodiments of the present disclosure, the first limiting structure is disposed on the outer circumferential surface of the moving member 2, and the second limiting structure is a limiting protrusion 231 disposed on the groove 23 (not shown in the figure). For example, an opening extending radially through the moving member 2 is formed in the moving member 2. The fitting structure 11 may rotate from an outer periphery of the moving member 2 to the groove 23 through the opening when the turntable 1 rotates from the first extreme position to the second extreme position. The fitting structure 11 may rotate from the groove 23 to the outer periphery of the moving member 2 through the opening when the turntable 1 rotates from the second extreme position to the first extreme position.

In this way, the rotation angle limitation of the turntable 1 is achieved while the formation of the first limiting structure is made convenient, and the configuration of the groove 23 can reduce the weight of the moving member 2, thereby effectively improving the smoothness of the movement of the turntable 1 and the moving member 2. In addition, since the second limiting structure is disposed on the groove 23, the space occupied by the first limiting structure and the second limiting structure in the circumferential direction of the moving member 2 is relatively small, so that a volume of the rotation angle limiting mechanism 100 can be reduced.

It may be understood that the actual positions and structures of the first limiting structure and the second limiting structure may be determined based on actual requirements to better satisfy a practical application.

In some embodiments of the present disclosure, with reference to FIG. 10 and FIG. 14, the fitting structure 11 is a limiting bump arranged/disposed on the turntable 1. In the examples of FIG. 10 and FIG. 14, two limiting bumps are arranged/disposed on the turntable 1, including a first limiting bump 111 and a second limiting bump 112. The first limiting bump 111 is arranged/disposed adjacent to a center of the turntable 1, and the second limiting bump 112 is arranged/disposed away from the center of the turntable 1 relative to the first limiting bump 111. For example, the second limiting bump 112 may be located at an edge of the turntable. By configuring the fitting structure 11 as a limiting bump, the fitting structure 11 can abut against the side surface of the corresponding first limiting structure or second limiting structure when the turntable 1 rotates to the first extreme position or the second extreme position. The limitation is reliable, the structure is simpler, and processing is convenient. Therefore, the processing efficiency of the rotation angle limiting mechanism 100 can be effectively improved, and the costs can be reduced.

A process for fitting the fitting structure 11 with the first limiting structure and the second limiting structure is described below with reference to FIG. 10 and FIG. 12. Two fitting structures 11 and two pairs of first limiting structures and second limiting structure are configured herein, for example.

As shown in FIG. 10, two protruding portions 221 are disposed on the outer circumferential surface of the moving member 2. The two protruding portions 221 form a pair (e.g., a first pair) of first limiting structure and second limiting structure, and the two protruding portions 221 are respectively a first protruding portion and a second protruding portion. Two limiting protrusions 231 are disposed in the groove 23. The two limiting protrusions 231 are the other pair (e.g., a second pair) of first limiting structure and second limiting structure, and the two limit protrusions 231 are respectively a first protrusion and a second protrusion. Two ends of the moving member 2 in a length direction are respectively a first end and a second end. The first protruding portion and the first protrusion are arranged/disposed adjacent to the first end, and the second protruding portion and the second protrusion are arranged/disposed adjacent to the second end.

When the turntable 1 rotates to the first extreme position, the first limiting bump 111 abuts against the first protrusion, and the second limiting bump 112 abuts against the second protruding portion. When the turntable 1 rotates to the second extreme position, the first limiting bump 111 abuts against the second protrusion, and the second limiting bump 112 abuts against the first protruding portion.

Since the two fitting structures 11 can respectively abut against the limiting structures (that is, the first limiting structure and the second limiting structure) on the two ends of the moving member 2 when the turntable 1 rotates to the first extreme position or the second extreme position, the force on the moving member 2 is more uniform, thereby increasing the service life of the rotation angle limiting mechanism 100.

The two fitting structures 11 shown in FIG. 10 and FIG. 14 are used for illustrative purposes. A person of ordinary skill art can understand that the technical solutions with other numbers of fitting structures 11 fall within the protection scope of the present disclosure.

In some embodiments of the present disclosure, with reference to FIG. 10 and FIG. 14, the fitting structure 11 is disposed on a side surface of the turntable 1 facing the moving member 2. In this way, the fitting structure 11 can fit the first limiting structure or the second limiting structure more effectively when the turntable 1 rotates to the first extreme position and the second extreme position. In addition, configuring the fitting structure 11 in such a way can reduce a circumferential dimension of the turntable 1, thereby reducing the volume of the rotation angle limiting mechanism 100. When the rotation angle limiting mechanism 100 is applied to the vehicle steering system 200 such as a steering-by-wire system, the space occupied by the vehicle steering system 200 can be reduced, thereby facilitating the spatial layout of the vehicle.

Figure 1:
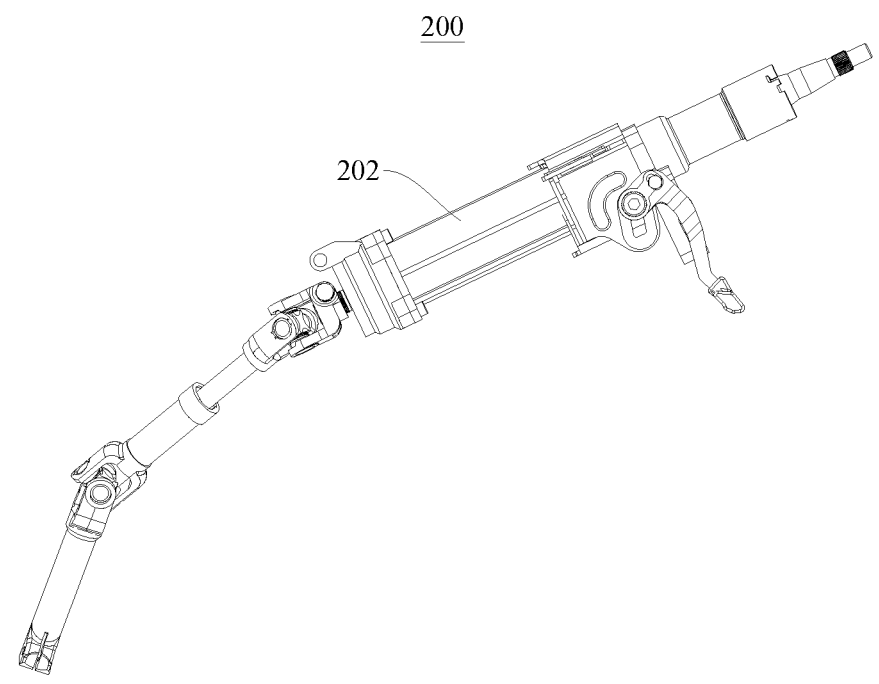
FIG. 1 is a perspective view of a vehicle steering system according to an embodiment of the present disclosure.
Figure 2:
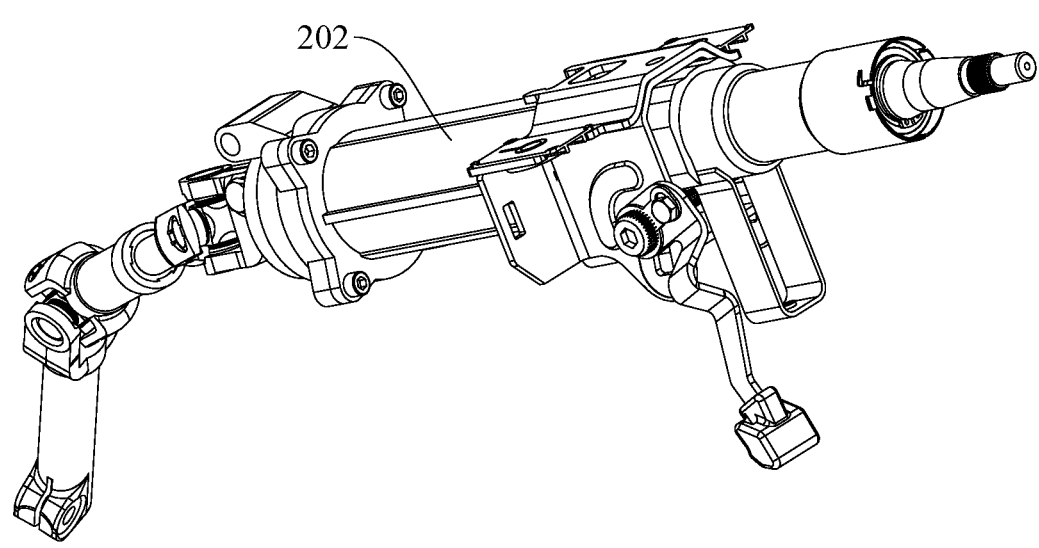
FIG. 2 is a perspective view of the vehicle steering system shown in FIG. 1 in another angle.
Figure 3:
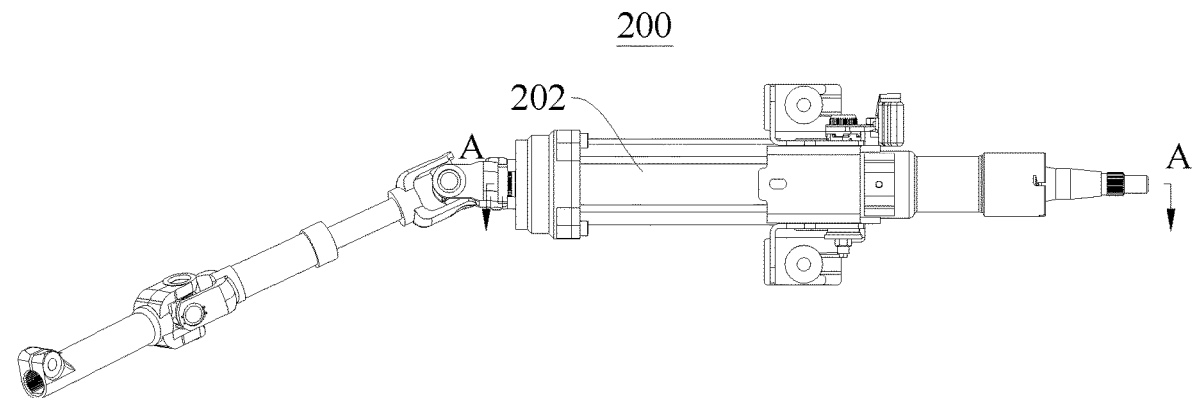
FIG. 3 is a schematic structural diagram of the vehicle steering system according to an embodiment of the present disclosure.
Figure 4:
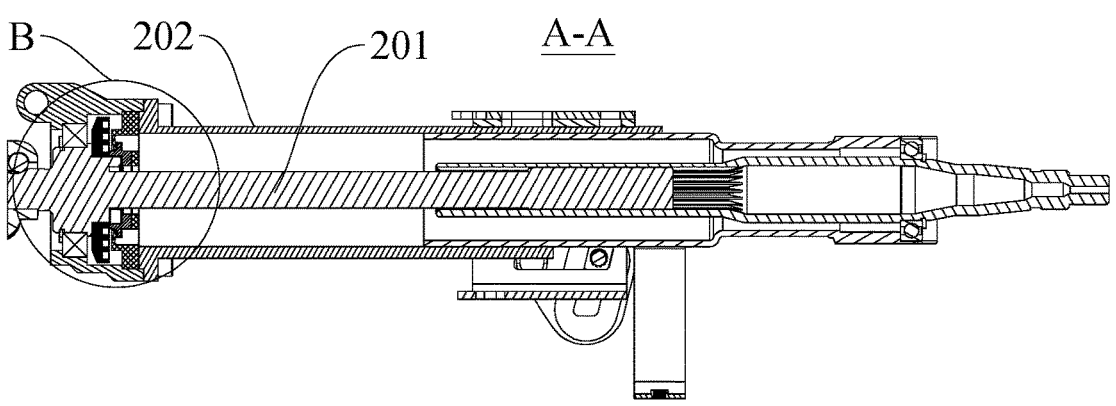
FIG. 4 is a cross-sectional view along a line A-A in FIG. 3.
Figure 5:
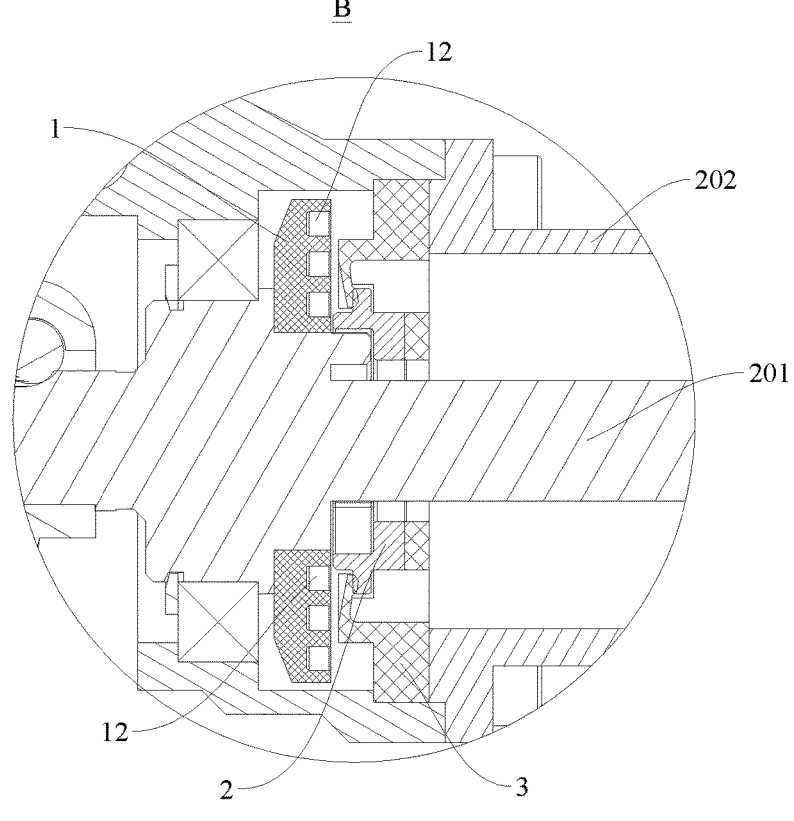
FIG. 5 is an enlarged view of a part B circled in FIG. 4.
Figure 6:
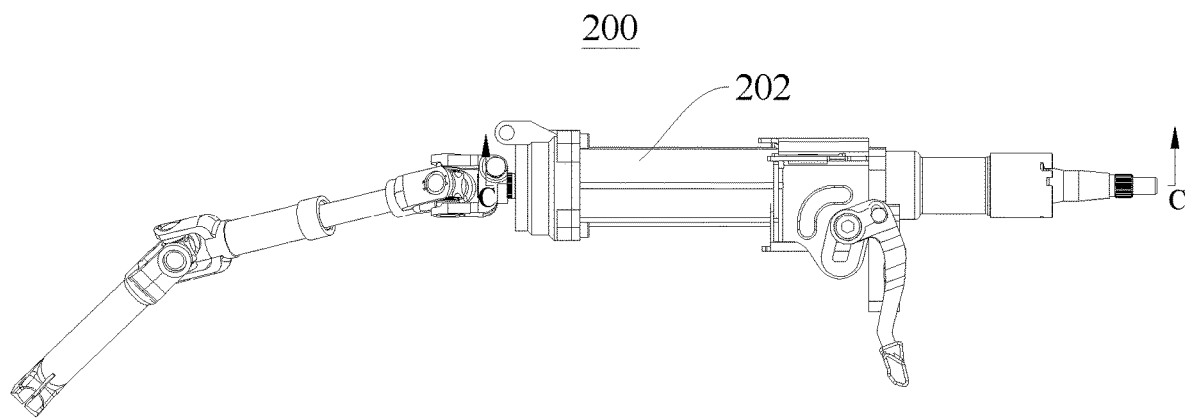
FIG. 6 is a schematic structural diagram of the vehicle steering system according to an embodiment of the present disclosure from another angle.

In some embodiments of the present disclosure, with reference to FIG. 5, FIG. 8, and FIG. 14, a spiral groove 12 is arranged/disposed on the turntable 1, a guide shaft 24 is arranged/disposed on the moving member 2, the guide shaft 24 movably fits in the spiral groove 12, and the turntable 1 drives the moving member 2 to move through the guide shaft 24. In the example of FIG. 8, a right end of the guide shaft 24 is connected with the moving member 22, and a left end of the guide shaft 24 fits in the spiral groove 12 and is movable in the spiral groove 12. During the rotation of the turntable 1, the guide shaft 24 moves in the spiral groove 12 relative to the spiral groove 12 to drive the moving member 2 to move. When the turntable 1 rotates to the first extreme position, the guide shaft 24 may be located at one of two circumferential ends of the spiral groove 12. When the turntable 1 rotates to the second extreme position, the guide shaft 24 may be located at the other of the two circumferential ends of the spiral groove 12.

By configuring the above spiral groove 12 and guide shaft 24, the turntable 1 can drive the moving member 2 to move while rotating. Moreover, since the spiral groove 12 may extend smoothly in a spiral shape, the movement of the guide shaft 24 in the spiral groove 12 is relatively stable. When the rotation angle limiting mechanism 100 is applied to the vehicle steering system 200 such as a steering-by-wire system, by configuring the spiral groove 12 in such a way, the structure is simple, and the friction between the turntable 1 and the guide shaft 24 is substantially consistent during the control of the steering wheel for steering by a driver, so that the driving comfort can be effectively improved for the driver. In addition, by causing the guide shaft 24 to move in the spiral groove 12, the turntable 1 can rotate by a large angle (for example, greater than 360°), so that the large angle limitation can be achieved and the steering requirement of the vehicle can be fully satisfied.

According to some embodiments of the present disclosure, a rotation angle of the spiral groove 12 in the circumferential direction of the turntable 1 is $\alpha$, and $\alpha$ satisfies $720° \leq \alpha \leq 1440°$. In an embodiment, for example, when $\alpha < 720°$, the rotation angle of the spiral groove 12 in the circumferential direction of the turntable 1 is excessively small. When the rotation angle limiting mechanism 100 is applied to the vehicle steering system 200 such as a steering-by-wire system, the rotation angle of the turntable 1 may not satisfy the steering requirement of the vehicle. When $\alpha > 1440°$, the rotation angle of the spiral groove 12 in the circumferential direction of the turntable 11 is excessively large, which increases the processing difficulty of the spiral groove 12. By causing the rotation angle $\alpha$ of the turntable 1 when the turntable 1 rotates from the first extreme position to the second extreme position or from the second extreme position to the first extreme position to satisfy $720° \leq \alpha \leq 1440°$, the large angle limitation of the turntable 1 can be achieved. When the rotation angle limiting mechanism 100 is applied to the vehicle steering system 200, the steering requirement of the vehicle can be effectively satisfied, and the processing difficulty of the spiral groove 12 can be reduced, thereby reducing the manufacturing costs.

According to some embodiments of the present disclosure, the rotation angle $\alpha$ may be 900°. In this way, when the rotation angle limiting mechanism 100 is applied to the vehicle steering system 200 such as the steering-by-wire system, the rotation angle of the steering wheel is 2.5 circles, which means that when the steering wheel is at a central position 0°, the steering wheel may rotate by a maximum angle of 450° clockwise or a maximum angle of 450° counterclockwise, which achieves the rotation angle limitation while effectively satisfying the steering requirement of the vehicle, and facilitates the processing and manufacturing of the turntable 1.

Certainly, the present disclosure is not limited thereto. The rotation angle $\alpha$ may also be other angles. It may be understood that a value of a may be set based on actual requirements, such as vehicle steering requirements and application scenarios, to better satisfy a practical application.

In the embodiments of the present disclosure, referring to FIG. 9, FIG. 11, and FIG. 13, the rotation angle limiting mechanism 100 further includes a fixed member 3. A fitting groove 31 is formed on the fixed member 3. The moving member 2 movably fits in the fitting groove 31. The moving member 2 moves in the fitting groove 31 when the turntable 1 rotates.

In the examples of FIG. 11 and FIG. 13, the fitting groove 31 extends radially along the turntable 1, and the moving body 21 of the moving member 2 fits in the fitting groove 31 and is movable relative to the fitting groove 31. During the rotation of the turntable 1 around a central axis of the turntable 1, the guide shaft 24 moves along the spiral groove 12. Since the guide shaft 24 is disposed on the moving member 2, the guide shaft 24 drives the moving member 2 to move relative to the fixed member 3 in the fitting groove 31. By configuring the above fitting groove 31, the fitting groove 31 can provide the effective limitation and guide, so that the moving member 2 can move along the fitting groove 31, and the rotation of the moving member 2 can be limited, thereby ensuring the limiting reliability of the rotation angle limiting mechanism 100.

According to some embodiments of the present disclosure, as shown in FIG. 13, two bosses 4 are disposed on the fixed member 3. The two bosses 4 are respectively located at two ends of fitting groove 31 in a length direction. When the turntable 1 rotates to the first extreme position or the second extreme position, the moving member 2 abuts against the corresponding boss 4, which prevents the moving member 2 from falling out of the fitting groove 31, and further limit the rotation of the turntable 1, so that the angle limitation of the turntable 1 is more reliable.

In some embodiments of the present disclosure, as shown in FIG. 5, FIG. 8, FIG. 9, and FIG. 11 to FIG. 13, moving portions 222 are disposed on two sides of the mounting portion 22 in a width direction, and each moving portion 222 extends beyond a corresponding side surface of the moving body 21. Two fitting portions 32 opposite to each other are disposed on the fixed member 3. The two fitting portions 32 are respectively located on two sides of the fitting groove 31 in a width direction. A chute is defined between each fitting portion 32 and the fixed member 3. The two moving portions 222 respectively fit in the two chutes. By fitting the moving portions 222 in the chutes, the movement of the moving member 2 in an axial direction of the turntable 1 can be limited.

In some embodiments of the present disclosure, a maximum torque M borne by the rotation angle limiting mechanism 100 is M, and M satisfies M$\geq$50 N·m. In this way, the rotation angle limiting mechanism 100 can bear a large torque. When the rotation angle limiting mechanism 100 is applied to the vehicle steering system 200 such as the steering-by-wire system, it may ensure that the vehicle steering system 200 has a high structural strength, thereby improving the structural stability of the entire vehicle steering system 200.

With reference to FIG. 4, FIG. 5, and FIG. 7 to FIG. 10, the vehicle steering system 200 in the embodiment of the second aspect of the present disclosure, such as the steering-by-wire system, includes the steering shaft 201 and the rotation angle limiting mechanism 100. The rotation angle limiting mechanism 100 is the rotation angle limiting mechanism 100 according to the embodiment of the first aspect of the present disclosure, and the turntable 11 of the rotation angle limiting mechanism 100 is fixed to the steering shaft 201.

In the examples of FIG. 4, FIG. 5, and FIG. 7 to FIG. 10, the turntable 1, the fixed member 3, and the moving member 2 are all sleeved on the steering shaft 201. In this way, the structure of the vehicle steering system 200 can be more compact. The vehicle steering system 200 may further include a housing 202. The steering shaft 201 is disposed in the housing 202 and rotates around a central axis of the steering shaft 201, and the fixed member 3 is fixed in the housing 202. During the rotation of the steering shaft 201 around the central axis of the steering shaft 201, the turntable 1 may rotate with the steering shaft 201 and drive the moving member 2 to move. When the fitting structure 11 abuts against the first limiting structure, the turntable 1 rotates to the first extreme position. When the fitting structure 11 abuts against the second limiting structure, the turntable 1 rotates to the second extreme position, thereby achieving the rotation angle limitation of the steering shaft 201. In this way, when the steering shaft 201 of the vehicle steering system 200 is separated from the steering gear (for example, in the steering-by-wire system), the rotation angle limitation of the steering shaft 201 can be achieved, thereby avoiding the damage to components such as a clock spring and an angle sensor caused by the arbitrary rotation of the steering shaft 201.

In the vehicle steering system 200 in the embodiments of the present disclosure, such as the steering-by-wire system, the effective limitation can be realized by using the above-mentioned rotation angle limiting mechanism 100, thereby avoiding the damage to components such as a clock spring and an angle sensor caused by the arbitrary rotation of the steering shaft 201.

A vehicle in the embodiments of the present disclosure (not shown in the figure) includes the vehicle steering system 200 in the above embodiment of the present disclosure.

In the vehicle in the embodiments of the present disclosure, the above vehicle steering system 200 is used, so that the rotation angle limitation of the steering shaft 201 can be achieved when the steering torque transmission between the steering shaft 201 and the steering gear is cut off, thereby avoiding the arbitrary rotation of the steering shaft 201. In this way, the service life of the vehicle can be increased, and the reliability of the vehicle can be improved.

Other compositions and operations of the vehicle in the embodiments of the present disclosure are known to a person of ordinary skill in the art, and therefore are not described in detail herein.

In the description of the present disclosure, it should be understood that orientation or position relationships indicated by the terms such as "center", "longitudinal", "transverse", "length", "width", "thickness", "up", "down", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the drawings, and are used only for ease and brevity of description of the present disclosure, rather than indicating or implying that the mentioned device or element needs have a particular orientation or be constructed and operated in a particular orientation. Therefore, such terms should not be construed as a limitation on the present disclosure.

Furthermore, the terms "first" and "second" are merely used for descriptive purpose, and should not be interpreted as indicating or implying relative significance or implicitly indicating a number of the indicated technical features. Therefore, features defined by "first" and "second" may explicitly or implicitly include one or more such features. In the descriptions of the present disclosure, "a plurality of" means more than two, unless otherwise defined.

In the present disclosure, unless otherwise explicitly specified or defined, the terms such as "mount", "connect", "connection", and "fix" should be understood in a broad sense. For example, the connection may be a fixed connection, a detachable connection, or an integral connection; or may be a mechanical connection or an electrical connection; or may be a direct connection, an indirect connection through an intermediate medium, internal communication between two elements, or an interaction relationship between two elements. A person of ordinary skill in the art may understand the specific meanings of the above terms in the present disclosure according to specific situations.

In the present disclosure, unless otherwise explicitly specified and defined, a first feature being "on" or "under" a second feature may mean that the first feature is in direct contact with the second feature, or the first feature is in indirect contact with the second feature by using an intermediate medium. Moreover, the first feature being "over", "above", and "on" the second feature may mean that the first feature is directly above or obliquely above the second feature, or merely means that the first feature has a larger horizontal height than the second feature. The first feature being "under", "below" and "underneath" the second feature may mean that the first feature is directly below or obliquely below the second feature, or merely means that the first feature has a smaller horizontal height than the second feature.

In the description of the present disclosure, description of a reference term such as "an embodiment," "some embodiments," "an example," "a specific example," or "some examples" means that specific features, structures, materials, or characteristics described with reference to the embodiment or the example is included in at least one embodiment or example of the present disclosure. In this specification, schematic description of the above terms is not necessarily directed at the same embodiment or example. Besides, the specific features, structures, materials, or characteristics that are described may be combined in proper manners in any one or more embodiments or examples. In addition, a person skilled in the art may integrate or combine different embodiments or examples described in the specification and features of the different embodiments or examples as long as they are not contradictory to each other.

Although the embodiments of the present disclosure have been shown and described above, it may be understood that, the above embodiments are exemplary and should not be understood as a limitation on the present disclosure. A person of ordinary skill in the art may make changes, modifications, replacements, or variations to the above embodiments within the scope of the present disclosure.

What is claimed is:

1. A rotation angle limiting mechanism, comprising:
a turntable, wherein at least one fitting structure is disposed on the turntable; and
a moving member comprising a groove and an opening extending radially through the moving member, wherein:
a first limiting structure and a second limiting structure are disposed on the moving member; the turntable rotates and drives the moving member to move so that the fitting structure abuts against one of the first limiting structure or the second limiting structure; the turntable is at a first extreme position when the fitting structure abuts against the first limiting structure; and the turntable is at a second extreme position when the fitting structure abuts against the second limiting structure; and the fitting structure rotates from an outer periphery of the moving member to the groove through the opening when the turntable rotates from the first extreme position to the second extreme position, and the fitting structure rotates from the groove to the outer periphery of the moving member through the opening when the turntable rotates from the second extreme position to the first extreme position.

2. The mechanism according to claim 1, wherein the first limiting structure and the second limiting structure are disposed on an outer circumferential surface of the moving member.

3. The mechanism according to claim 2, wherein the first limiting structure and the second limiting structure are disposed spaced apart from each other along a circumferential direction of the moving member.

4. The mechanism according to claim 2, wherein each of the first limiting structure and the second limiting structure comprises a protruding portion.

5. The mechanism according to claim 4, wherein the moving member comprises a moving body and a mounting portion disposed on a side surface of the moving body facing the turntable; and a cross-sectional area of the mounting portion is less than a cross-sectional area of the moving body; and the two protruding portions are disposed on an outer circumferential surface of the mounting portion and are spaced apart from each other along a circumferential direction of the mounting portion.

6. The mechanism according to claim 1, wherein the first limiting structure and the second limiting structure are disposed in the groove.

7. The mechanism according to claim 6, wherein each of the first limiting structure and the second limiting structure comprises a limiting protrusion.

8. The mechanism according to claim 1, wherein the first limiting structure is disposed on an outer circumferential surface of the moving member; and the second limiting structure comprises a limiting protrusion disposed in the groove.

9. The mechanism according to claim 1, wherein at least two pairs of limiting structure are disposed on the moving member, and each of the at least two pairs of limiting structure comprises the first limiting structure and the second limiting structure; a first pair of the at least two pairs of limiting structure is disposed on an outer circumferential surface of the moving member; and a second pair of the at least two pairs of limiting structure is disposed on a side wall of the groove.

10. The mechanism according to claim 1, wherein the fitting structure comprises at least one limiting bump disposed on the turntable.

11. The mechanism according to claim 10, wherein the at least one limiting bump comprises a first limiting bump and a second limiting bump disposed on the turntable; and the first limiting bump is disposed adjacent to a center of the turntable, and the second limiting bump is disposed away from the center of the turntable with respect to the first limiting bump.

12. The mechanism according to claim 1, wherein the fitting structure is disposed on a surface of the turntable facing the moving member.

13. The mechanism according to claim 1, wherein a spiral groove is disposed on the turntable; a guide shaft is disposed on the moving member; the guide shaft movably fits in the spiral groove; and the turntable drives the moving member to move through the guide shaft.

14. The mechanism according to claim 13, wherein a rotation angle of the spiral groove in a circumferential direction of the turntable is a; and a satisfies: $720° \leq \alpha \leq 1440°$.

15. The mechanism according to claim 1, further comprising:
a fixed member, wherein a fitting groove is formed on the fixed member; the moving member movably fits in the fitting groove; and the moving member moves in the fitting groove when the turntable rotates.

16. The mechanism according to claim 1, wherein a maximum torque borne by the rotation angle limiting mechanism is M; and M satisfies: $M \geq 50$ N·m.

17. A vehicle steering system, comprising:
a steering shaft; and
a rotation angle limiting mechanism, wherein the rotation angle limiting mechanism comprises:
a turntable, wherein at least one fitting structure is disposed on the turntable; and
a moving member comprising a groove and an opening extending radially through the moving member, wherein:
a first limiting structure and a second limiting structure are disposed on the moving member; the turntable rotates and drives the moving member to move so that the fitting structure abuts against one of the first limiting structure or the second limiting structure; the turntable is at a first extreme position when the fitting structure abuts against the first limiting structure; and the turntable is at a second extreme position when the fitting structure abuts against the second limiting structure;
the fitting structure rotates from an outer periphery of the moving member to the groove through the opening when the turntable rotates from the first extreme position to the second extreme position, and the fitting structure rotates from the groove to the outer periphery of the moving member through the opening when the turntable rotates from the second extreme position to the first extreme position; and
the turntable is fixed to the steering shaft.

18. A vehicle, comprising a vehicle steering system comprising:
a steering shaft; and
a rotation angle limiting mechanism, wherein the rotation angle limiting mechanism comprises:
a turntable, wherein at least one fitting structure is disposed on the turntable; and
a moving member comprising a groove and an opening extending radially through the moving member, wherein:
a first limiting structure and a second limiting structure are disposed on the moving member; the turntable rotates and drives the moving member to move so that the fitting structure abuts against one of the first limiting structure or the second limiting structure; the turntable is at a first extreme position when the fitting structure abuts against the first limiting structure; and the turntable is at a second extreme position when the fitting structure abuts against the second limiting structure;

the fitting structure rotates from an outer periphery of the moving member to the groove through the opening when the turntable rotates from the first extreme position to the second extreme position, and the fitting structure rotates from the groove to the outer periphery of the moving member through the opening when the turntable rotates from the second extreme position to the first extreme position; and the turntable is fixed to the steering shaft.

\* \* \* \* \*